US012680447B2

(12) United States Patent
Tomaszewski et al.

(10) Patent No.: US 12,680,447 B2
(45) Date of Patent: Jul. 14, 2026

(54) MODULAR CONTROL UNIT AND SYSTEMS COMPRISING THE SAME

(71) Applicants: VERACIO LTD., Salt Lake City, UT (US); GLOBALTECH CORPORATION PTY LTD, Forrestfield (AU)

(72) Inventors: Adam Tomaszewski, Mississauga (CA); Khaled Hejleh, Peppermint Grove (AU); Gordon Stewart, Claremont (AU); Edwin Steele, Etobicoke (CA)

(73) Assignees: GLOBALTECH CORPORATION PTY LTD, Forrestfield (AU); VERACIO LTD., Salt Lake City, UT (US)

( * ) Notice: Subject to any disclaimer, the term of this patent is extended or adjusted under 35 U.S.C. 154(b) by 56 days.

(21) Appl. No.: 17/798,483

(22) PCT Filed: Feb. 12, 2021

(86) PCT No.: PCT/IB2021/000093
§ 371 (c)(1),
(2) Date: Aug. 9, 2022

(87) PCT Pub. No.: WO2021/161106
PCT Pub. Date: Aug. 19, 2021

(65) Prior Publication Data
US 2023/0073079 A1 Mar. 9, 2023

Related U.S. Application Data

(60) Provisional application No. 62/975,423, filed on Feb. 12, 2020.

(51) Int. Cl.
*E21B 47/12* (2012.01)
*E21B 47/00* (2012.01)
(Continued)

(52) U.S. Cl.
CPC .............. *E21B 47/12* (2013.01); *E21B 47/00* (2013.01); *E21B 47/04* (2013.01); *G01D 9/02* (2013.01); *G01V 1/44* (2013.01); *G01V 1/52* (2013.01)

(58) Field of Classification Search
CPC .......... E21B 47/12; E21B 47/00; E21B 47/04; E21B 47/01; E21B 47/02; G01D 9/02;
(Continued)

(56) References Cited

U.S. PATENT DOCUMENTS

| | | | | | |
|---|---|---|---|---|---|
| 4,537,255 | A | * | 8/1985 | Regalbuto | ........... E21B 31/1075 166/299 |
| 6,305,944 | B1 | * | 10/2001 | Henry | .................... E21B 43/28 439/339 |

(Continued)

FOREIGN PATENT DOCUMENTS

| | | | | |
|---|---|---|---|---|
| EP | 3556994 | A1 | 10/2019 | |
| JP | 2013126536 | A | * 6/2013 | ............ A61M 39/10 |

(Continued)

OTHER PUBLICATIONS

RU-2464419-C2 English Language Translation (Year: 2012).*

(Continued)

*Primary Examiner* — Steven Lim
*Assistant Examiner* — Jerold B Murphy
(74) *Attorney, Agent, or Firm* — Stites & Harbison, PLLC; Terry L. Wright

(57) ABSTRACT

A control unit can comprise a housing and circuitry disposed within the housing. The circuitry can comprise a communications module, a memory, and a processor in communication with the memory and the communications module. A power source can be disposed within the housing. An input port that is configured to mate with a complementary output of a sensor unit that is external to the housing. The input port
(Continued)

can be in communication with the circuitry. The input port can be configured to interface with the sensor unit.

18 Claims, 7 Drawing Sheets

(51) Int. Cl.
| | |
|---|---|
| *E21B 47/02* | (2006.01) |
| *E21B 47/04* | (2012.01) |
| *G01D 9/02* | (2006.01) |
| *G01V 1/44* | (2006.01) |
| *G01V 1/52* | (2006.01) |

(58) Field of Classification Search
CPC .......... G01D 11/24; G01D 21/00; G01V 1/44; G01V 1/52; H01R 13/622; H01R 13/6658; H01R 13/6683; H01R 24/86
See application file for complete search history.

(56) References Cited

U.S. PATENT DOCUMENTS

| | | | |
|---|---|---|---|
| 9,170,132 B2 * | 10/2015 | Palassis | .................... G01D 5/24 |
| 2006/0220649 A1 * | 10/2006 | Martinez | ................. E21B 47/01 |
| | | | 324/347 |

FOREIGN PATENT DOCUMENTS

| | | | | |
|---|---|---|---|---|
| 2012/0096935 A1 | 4/2012 | Finke et al. | | |
| 2013/0133882 A1 | 5/2013 | Harms et al. | | |
| 2014/0265565 A1 | 9/2014 | Cooley et al. | | |
| 2016/0076936 A1 | 3/2016 | Schoch et al. | | |
| 2018/0198960 A1 | 7/2018 | Finke et al. | | |

FOREIGN PATENT DOCUMENTS

| | | | | |
|---|---|---|---|---|
| RU | 2464419 C2 * | 10/2012 | ............. | E21B 36/04 |
| WO | WO-2009088501 A1 * | 7/2009 | .............. | G01V 5/04 |
| WO | 2020018107 A1 | 1/2020 | | |

OTHER PUBLICATIONS

JP-2013126536-A English Language Translation (Year: 2013).*
Wang et al., "Audio jack based miniaturized mobile phone electro-chemical sensing platform", Sensors and Actuators B: Chemical 209, pp. 677-685, 2015.
Search Report and Written Opinion of PCT App. No. PCT/IB2021/000093, dated Apr. 15, 2021.

* cited by examiner

MODULAR CONTROL UNIT AND SYSTEMS COMPRISING THE SAME

CROSS-REFERENCE TO RELATED APPLICATION

This application is a national phase filing under 35 U.S.C. § 371 of International Application No. PCT/IB2021/000093, filed Feb. 12, 2021, which claims priority to and the benefit of U.S. Provisional Patent Application No. 62/975,423, filed Feb. 12, 2020. The entirety of each of these applications is hereby incorporated by reference therein.

FIELD

This application relates to modular control units and, in particular, to modular control units for use with sensors for drilling and borehole data collection.

BACKGROUND

Conventional logging tools, such as, for example, downhole logging probes, require a cable to provide power to the logging tool and communicate data from the logging tool to the surface. Accordingly, the power and communication cables can cause complications, particularly when using multiple logging tools. Such complications can include physical durability, cost, and insufficient bandwidth (for example, due to multiple sensors sharing a single cable).

SUMMARY

Disclosed herein, in one aspect, is a control unit comprising a housing and circuitry disposed within the housing. The circuitry can comprise a communications module, a memory, and a processor in communication with the memory and the communications module. A power source can be disposed within the housing. An input port that is configured to mate with a complementary output of a sensor unit that is external to the housing. The input port can be in communication with the circuitry. The input port can be configured to interface with the sensor unit.

A sensing apparatus can comprise a control unit and a sensor unit coupled to the first end of the control unit, wherein the sensor unit comprises an output port that is in communication with the input port of the control unit.

A sensing apparatus can comprise a first sensor assembly and a second sensor assembly that is mechanically coupled to the first sensor assembly. The first sensor assembly can comprise a first control unit and a first sensor unit. The second sensor assembly can comprise a second control unit and a second sensor unit.

A system can comprise a computing device in communication with the communications module of the control unit. The computing device can comprise a memory and at least one processor in communication with the memory of the computing device. The memory of the computing device can have instructions thereon that, when executed, cause the processor to: receive data from the first control unit; receive data from the second control unit; and store the data from the first sensor unit and the second sensor unit so that the data from the first sensor unit is related to the data from the second sensor unit.

Additional advantages of the disclosed system and method will be set forth in part in the description which follows, and in part will be understood from the description, or may be learned by practice of the disclosed system and method. The advantages of the disclosed system and method will be realized and attained by means of the elements and combinations particularly pointed out in the appended claims. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several embodiments of the disclosed apparatus, system, and method and together with the description, serve to explain the principles of the disclosed apparatus, system, and method.

DETAILED DESCRIPTION

Figures 1A, 1B:
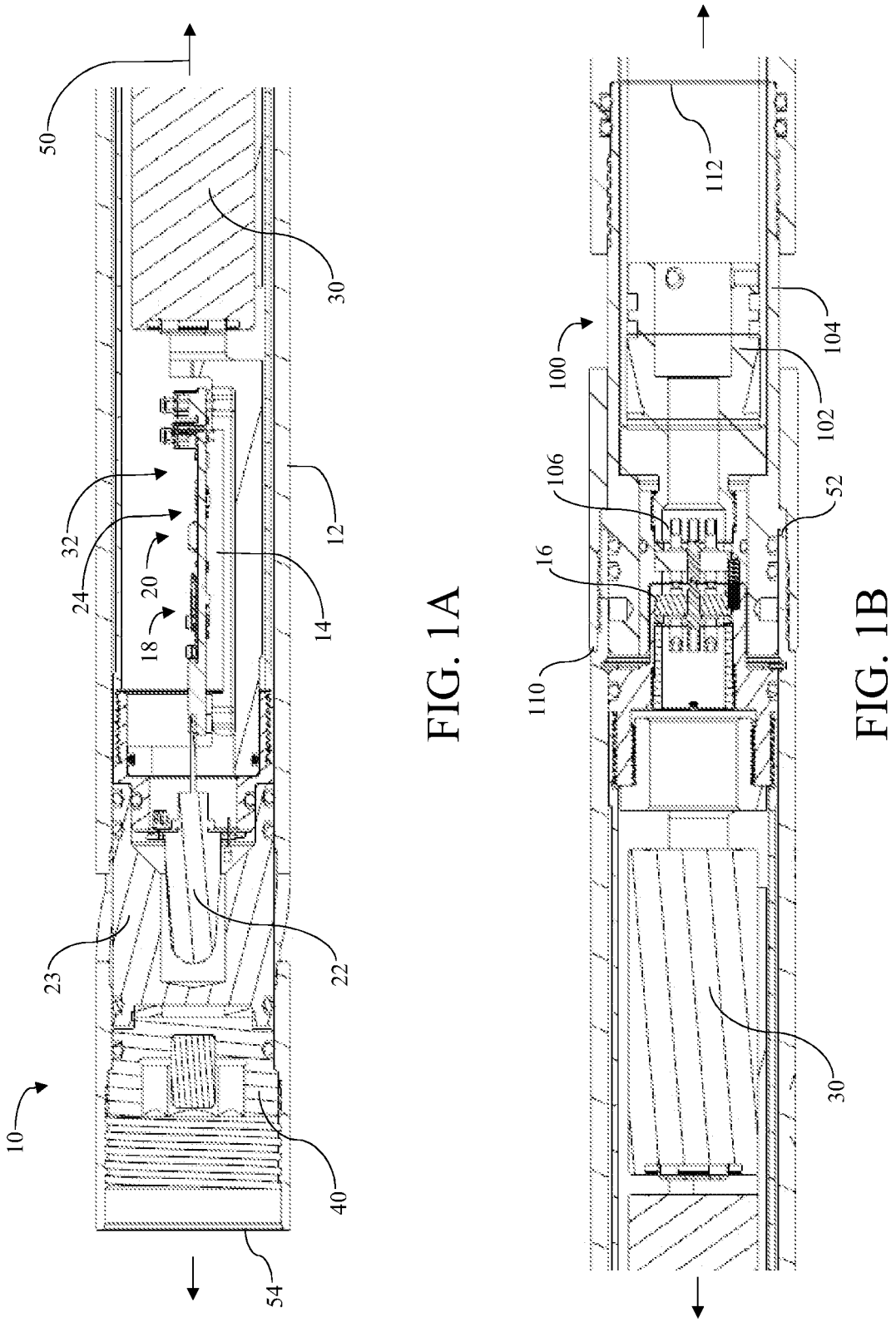
FIGS. 1A and 1B illustrate first and second cross sections of a sensor assembly comprising a sensor unit and a control unit, in accordance with embodiments disclosed herein. Alignment of the right side of FIG. 1A with the left side of FIG. 1B forms a composite longitudinal cross section of the sensor assembly.

The disclosed system and method may be understood more readily by reference to the following detailed description of particular embodiments and the examples included therein and to the Figures and their previous and following description.

It is to be understood that the terminology used herein is for the purpose of describing particular embodiments only and is not intended to limit the scope of the present invention which will be limited only by the appended claims.

It must be noted that as used herein and in the appended claims, the singular forms "a," "an," and "the" include plural references unless the context clearly dictates otherwise. Thus, for example, reference to "a protrusion" includes one or more of such protrusions, and so forth.

"Optional" or "optionally" means that the subsequently described event, circumstance, or material may or may not occur or be present, and that the description includes instances where the event, circumstance, or material occurs or is present and instances where it does not occur or is not present.

Ranges may be expressed herein as from "about" one particular value, and/or to "about" another particular value. When such a range is expressed, also specifically contemplated and considered disclosed is the range from the one particular value and/or to the other particular value unless the context specifically indicates otherwise. Similarly, when values are expressed as approximations, by use of the antecedent "about," it will be understood that the particular value forms another, specifically contemplated embodiment that should be considered disclosed unless the context specifically indicates otherwise. It will be further understood that the endpoints of each of the ranges are significant both in relation to the other endpoint, and independently of the other endpoint unless the context specifically indicates otherwise. Finally, it should be understood that all of the individual values and sub-ranges of values contained within an explicitly disclosed range are also specifically contemplated and should be considered disclosed unless the context specifically indicates otherwise. The foregoing applies regardless of whether in particular cases some or all of these embodiments are explicitly disclosed.

Optionally, in some aspects, when values are approximated by use of the antecedents "about," "substantially," or "generally," it is contemplated that values within up to 15%, up to 10%, up to 5%, or up to 1% (above or below) of the particularly stated value or characteristic can be included within the scope of those aspects.

As used herein, the term "proximal" refers to a direction toward a drill rig or drill operator and generally opposite a direction of drilling (and away from a formation or borehole), while the term "distal" refers to a direction away from the drill rig or drill operator and generally in the direction of drilling (and into a formation or borehole).

As disclosed herein, an output port should be understood to be a port that is configured at least for output. Accordingly, an output port can optionally be either a port that is configured only for output or a port that is configured for both input and output (e.g., an I/O data port). Likewise, an input port should be understood to be a port that is configured at least for input. Thus, an input port can optionally be either a port that is configured only for input or a port that is configured for both input and output (e.g., an I/O data port).

Unless defined otherwise, all technical and scientific terms used herein have the same meanings as commonly understood by one of skill in the art to which the disclosed apparatus, system, and method belong. Although any apparatus, systems, and methods and materials similar or equivalent to those described herein can be used in the practice or testing of the present apparatus, system, and method, the particularly useful methods, devices, systems, and materials are as described.

Throughout the description and claims of this specification, the word "comprise" and variations of the word, such as "comprising" and "comprises," means "including but not limited to," and is not intended to exclude, for example, other additives, components, integers or steps. In particular, in methods stated as comprising one or more steps or operations it is specifically contemplated that each step comprises what is listed (unless that step includes a limiting term such as "consisting of"), meaning that each step is not intended to exclude, for example, other additives, components, integers or steps that are not listed in the step.

Disclosed herein, in various aspects and with reference to FIGS. 1A, 1B, 2, 4, and 5, is a control unit 10 for integrating with a sensor unit 100. The control unit 10 can be configured to couple to the sensor unit 100, thereby cooperatively defining a sensor assembly 200. As used herein, the term "sensor assembly" refers to a structure in which at least one control unit 10 is coupled to at least one sensor unit 100. In one example, the sensor unit 100 can comprise a housing 104 that is configured to mate with the control unit 10. The sensor unit 100 can further comprise one or more sensors or instrumentation 102 positioned within the housing 104. For example, the instrumentation 102 can comprise an orientation sensor (e.g., a gyroscope or deviation sensor), a pressure sensor, a temperature sensor, and/or one or more petrophysical sensors, such as, for example and without limitation, a natural gamma sensor, a magnetic susceptibility sensor, a resistivity sensor, an induced polarization sensor, an acoustic televiewer, a neutron sensor, a full wave sonic sensor, a density sensor, a caliper, or combinations thereof.

The control unit 10 can be configured to integrate within a system 1000. In this way, a plurality of control units 10 can interface with and communicate within a single network. Thus, data independently collected from each sensor unit 100 can be processed, combined, and correlated (by one or more control units and/or by one or more other computing devices as further disclosed herein). For example, each of the control units 10 can have a synchronized internal clock. Thus, at any given time, data collected by a first sensor unit 100A (e.g., a gyroscope) can be correlated to data collected by a second sensor unit 100B (e.g., a pressure sensor). In further aspects, data collected by a third sensor unit 100C (e.g., a temperature sensor) can likewise be correlated to the data collected by the first and second sensor units 100A, 100B. More generally, it is contemplated that any number of sensor units can collect data that can be correlated to data collected by other sensor units within the system 1000. In some aspects, the data can be processed to determine quality of (e.g., provide quality control of) the raw data being received. In further aspects, the data can be processed to convert the raw data (e.g., a resistance or a voltage) into processed data (e.g., an angle of orientation or a relative signal strength).

As further disclosed herein, the system 1000 can receive data from a drill rig 600 that similarly comprises an internal clock that is synchronized with internal clocks of other devices (e.g., control units 10) within the system 1000. The data (e.g., rod and/or wireline encoder data indicative of length of rods in a drill string or a length of deployed wireline cable) from the drill rig 600 can provide for depth calculations (e.g., the distance from the rig to the distal end of a drill string 700 (the end farthest from the rig), corresponding to end-of-hole (EOH) depth) for any given time based on the sum of the respective lengths of each drill string component within the drill string. It is contemplated that the sensor assemblies 200 can be positioned at a known location along a drill string with respect to a reference point such as, for example, the distal end of the drill string 700, or the drill bit 702. In some exemplary aspects, a first sensor (of a first sensor assembly) can have a known first position relative to a first known reference point (e.g., extending distally (in a direction away from the rig) from the drill bit by six inches), and a second sensor (of a second sensor assembly) can have a second known position relative to the first reference point or a different, second known reference point (e.g., spaced proximally (in the direction of the rig) from the drill bit by ten feet) for any given time. Thus, the depth of the sensor unit can be correlated with the time so that the captured data for any given sensor unit can be associated with the depth at which the data is captured. Moreover, providing a control unit 10 can easily enable universal compatibility within the system 1000, thereby avoiding incompatibility issues with other components of the system 1000 or, alternatively, requiring multiple independent sensor management systems.

Each control unit 10 can comprise a housing 12 and circuitry 14 disposed within the housing 12. The housing 12 can be fluidly sealed and pressure-tight to inhibit fluid entry therein even at high pressure (e.g., under the pressure at a bottom of a flooded borehole). The control unit 10 can comprise an input port 16 (e.g., comprising a plurality of pins) that is configured to communicate with the sensor unit 100. For example, the control unit 10 can comprise a male plug that is configured to be received within an output port 106 (e.g., a female socket comprising a plurality of targets that are configured to engage respective pins of the input port) of the sensor unit. In further embodiments, the male and female ports can be reversed, or any other suitable physical or wireless connection can be used to communicate data from the sensor unit to the control unit 10. In this way, the control unit 10 can receive, store, and process outputs from the sensor/instrumentation 102 of the coupled sensor unit 100. It is further contemplated that the control unit can communicate data to the sensor unit 100. Thus, in some aspects, the port 16 and the port 106 can each be input/output (I/O) ports that can enable two-way communication between the control unit 10 and the sensor unit 100. Two way communication can enable the control unit 10 to control aspects of the sensor unit 100, including, for example, the starting and stopping of data recordation, changing the sensor's mode, or adjusting performance based on on-board analytics of the control unit 10. For example, for a sensor unit comprising an optical sensor, the control unit 10 can be configured to receive data from the optical sensor and, based on the received data (e.g., data corresponding to a blurry image), change one or more aspects of the sensor unit (e.g., sensor light sensitivity or lens positon).

The circuitry 14 of each control unit 10 can comprise a memory 18, at least one processor 20, and a communications module 22. The circuitry 14 can be embodied as, for example, a printed circuit board. The circuitry 14 can be configured to receive data from the sensors/instrumentation 102 of the sensor unit 100 (e.g., through the port 16) and store the data from the sensor unit in the memory 18. The circuitry can further provide an internal clock that can by synchronized with the system 1000. The data from the coupled sensor unit 100 can be stored in the memory and associated with time values from the internal clock.

In some optional aspects, the circuitry 14 of each control unit 10 can comprise one or more inertial sensors 24 (e.g., accelerometers or an inertial measurement unit). The circuitry 14 can be configured to collect inertial measurement data from the inertial sensors 24 and associate the inertial measurement data with the time values from the internal clock to create an inertial measurement data array (or other data association in which the inertial measurement data are correlated with corresponding time values. In some aspects, the inertial measurement data array can be used in dead reckoning to approximate the position of the sensor assembly 200. For example, the control unit 10 or other computing device 1001 can use acceleration data to determine a velocity (e.g., via numerical integration) and then, using numerical integration of velocity over time, determine a change in position from an initial position. Accordingly, the inertial measurement data can be used in autonomous depth determination or for determination of movement, in general. In further aspects, it is contemplated that the inertial measurement data from the inertial sensors can be used for gesture recognition. In this way, for example, the control unit 10 can be initialized upon a particular gesture or movement profile (e.g., a stoppage of movement or a start of movement). In further aspects, the inertial measurement data can be used to determine connection to or decoupling of a sensor unit 100. In yet further aspects, the inertial measurement data can be used to determine an orientation (e.g., azimuthal angle and/or angle with respect to a vertical axis) of the control unit 10 within the borehole.

In further aspects, the inertial measurement data can be used to determine the order in which each sensor assembly 200 of a plurality of sensor assemblies is inserted into the drill string. For example, it can be assumed that the sensor assembly 200 with the earliest time of movement is the first sensor assembly inserted into the drill string or the first (i.e., most distally positioned) sensor assembly 200 coupled to a probe (or other apparatus) comprising a plurality of sensor assemblies. In alternative aspects, the order of the sensor assemblies can be manually provided. For example, an operator can assign an order for the sensor assemblies through a user interface.

In some aspects, the housing 12 of each control unit 10 can be configured to travel through a drill string. For example, the housing 12 optionally can have an elongate shape and a cylindrical outer surface. In some optional aspects, the housing 12 can have a longitudinal axis 50, a first end 52 and an opposing second end 54. The first end 52 can be configured to mate with a complementary mating portion of the housing 104 of the sensor unit 100. In some optional aspects, the housing 104 of the sensor unit 100 can have a first end 110 and an opposing second end 112, wherein the first end 110 of the housing 104 is configured to mate with the first end 52 of the control unit 10. In these aspects, the port 16 can be on the first end 52 of the control unit housing 12, and the port 106 can be on the first end 110 of the sensor unit housing 104.

Figure 6:
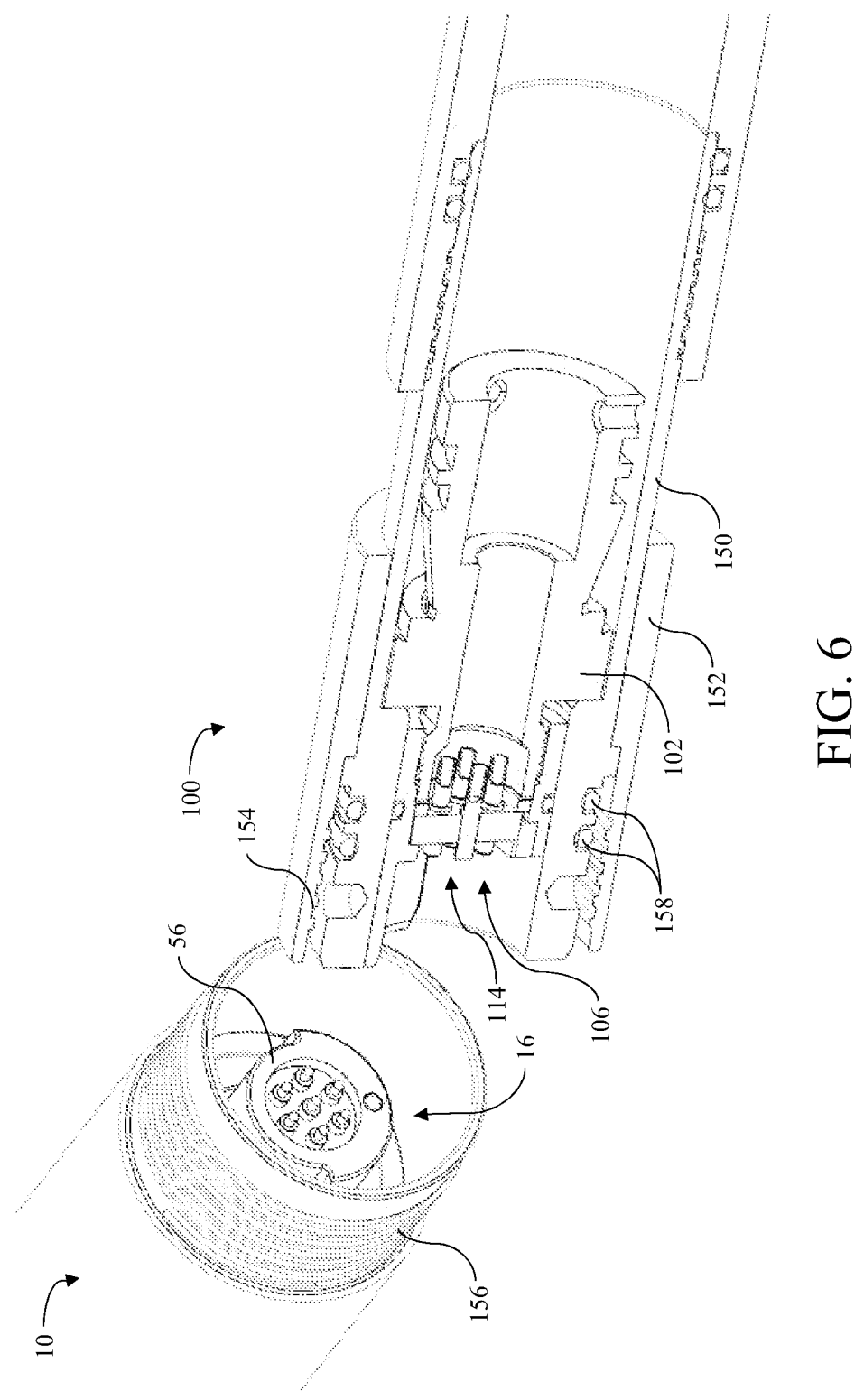
FIG. 6 is a perspective view showing exemplary mating structures for coupling of adjacent sensor assemblies as disclosed herein.
Figure 7:
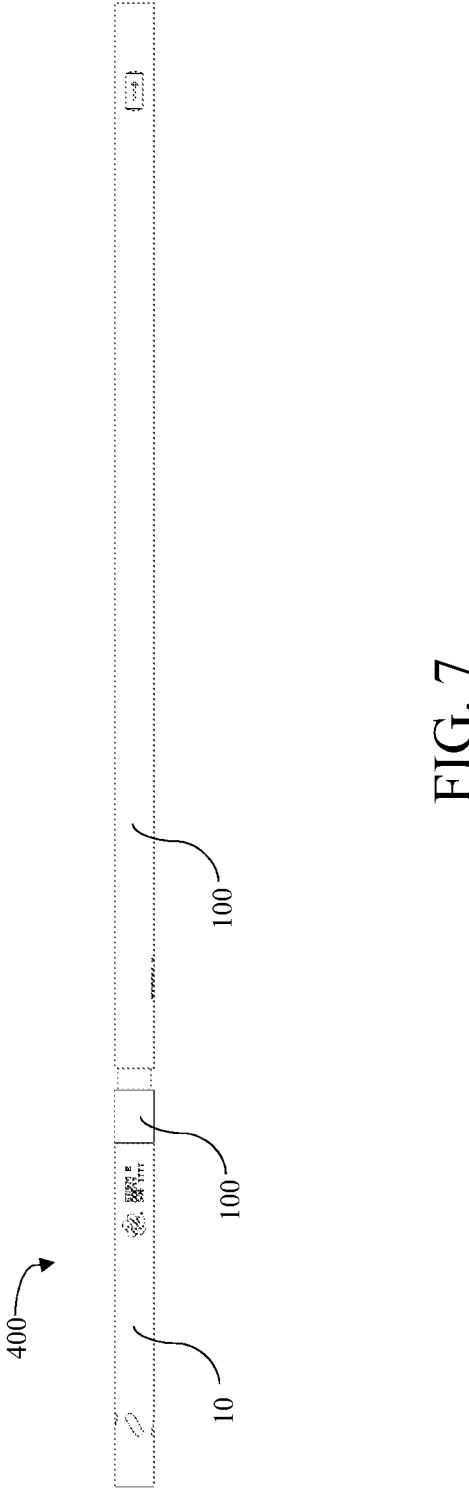
FIG. 7 is a side view of a sensing apparatus as disclosed herein.

In some aspects, the control unit 10 and sensor unit 100 can have complementary mating structures. In some optional aspects, the complementary mating structures can comprise respective male and female threads. For example, referring to FIG. 6, one of the control unit 10 or the sensor assembly 100 can comprise a threaded collar 152 that (a) is rotatable with respect to a body 150 of the control unit or sensor assembly 100 and (b) is axially slidable relative to the body 150. The threaded collar 152 can define internal female threads 154. The other of the control unit 10 or the sensor unit 100 can define male threads 156. In this way, once the respective port 16 and port 106 are engaged (e.g., connector pins are inserted into respective receptacles), the threaded collar 152 can be rotated to threadedly engage the male threads 156. Gaskets 158 can seal the union between the control unit 10 and the sensor unit 100. In further optional aspects, the complementary mating structures can comprise a notched body with spring pins (e.g., provided as components of the control unit or sensor unit) and a spring configured in a toroidal shape (e.g., a BAL-SEAL spring) (e.g., provided as a component of the other of the control unit or sensor unit).

In some aspects, the control unit 10 can comprise an alignment feature 56 on the first end 52 of the control unit 10 that is complementary to the mating portion of the sensor unit 100. For example, the alignment feature 56 can be a protrusion or a recess or other shape that is configured to mate with a complementary alignment feature 114 (e.g., a complementary recess or protrusion) of the housing 104. The alignment feature 56 can optionally be rotationally asymmetric about an alignment axis that is parallel to longitudinal axis 50 (or, optionally, can be the longitudinal axis 50) of the control unit housing 12. That is, the alignment feature can lack rotational symmetry about the alignment axis so that the feature does not coincide with an identical or similar feature when rotated by any angle between 0 and 360 degrees. In this way, the alignment feature 56 can inhibit misalignment and failed coupling between the control unit 10 and the sensor unit 100. The alignment feature 56 and complementary alignment feature 114 can comprise axially (longitudinally) extending surfaces that are offset along an axis that is transverse to the longitudinal axis by, for example, about 0.002 inches, in order inhibit interference between said axially extending surfaces.

A power source 30, such as, for example, at least one battery, can be disposed within the housing 12 of at least one control unit 10. The power source 30 can be configured to power the circuitry 14. The power source 30 can further be configured to power the sensor unit 100 that is coupled to the control unit 10. It is further contemplated that the power source 30 for the control unit can optionally be a receptacle that is configured to receive power input from a wired power cable, which can be particularly accessible for control units 10 that are configured for use with sensor units that are not deployed down-the-hole, as further disclosed herein. It is contemplated that the power source can be selected based on the need of the sensor assembly 200 or the environment to which the power source is exposed. For example, when the power source comprises or consists of batteries, the battery chemistry can be selected for high temperature. Accordingly, in some aspects, the power source 30 can be removable and replaceable. In further aspects, different control units 10 can have different power sources that can be advantageous for different applications. Thus, in these aspects, a first control unit can have a first power source (e.g., a first battery type), and a second control unit can have a second power source that is of a different type than the first power source (e.g., a second battery type). It is contemplated that the control unit can provide power through the input port 16, and the sensor unit can receive power through the output port 106.

The communications module 20 can be configured to communicate data that is captured by the sensor unit 100 and stored within the memory 18. For example, the control unit 10, via the communications module 20, can upload logged data to the network 1015. The communications module 20 can be configured for wireless communication (e.g., two-way wireless communication) such as, for example, Bluetooth, Wi-Fi or any suitable communication protocol. The housing 12 of the control unit 10 can define at least one communication window 23 (or, optionally, a plurality of communication windows that can be circumferentially spaced about the housing) that is configured to enable wireless communication through the housing. It is contemplated that the window 23 can comprise polycarbonate. It is further contemplated that the window can allow the control unit 10 to be pressure-tight. The housing 12 can comprise a sealing cap 40 that is configured to form a pressure tight seal on an end of the sensor unit. In further aspects, the communications module can be configured for wired transmission. For example, in some aspects, the communications module can comprise an I/O port. In some aspects, the I/O port can be the port 16 or a separate port.

Although generally described herein as a sensor unit 100 providing data to a control unit 10, with the control unit processing and storing data from the sensor unit and providing said data to a computing device 1001, it is further contemplated that the sensor unit can optionally comprise its own (e.g., on-board) processing and/or data storage capabilities. For example, in some aspects, the sensor unit can comprise a processor and memory in communication therewith. The processor of the sensor unit 100 can at least partially process data from the sensor 102. In some aspects, for example, the processor of the sensor unit 100 can apply a filter, convert a raw or filtered data signal to another signal, perform analog-to-digital conversion, etc. In further aspects, the sensor unit 100 can apply headers to the sensed data (e.g., associate the sensed data with at least one corresponding piece of data). In further aspects, the sensor unit 100 can be configured to communicate directly to the computing device 1001. For example, the sensor unit 100 can communicate data through its output port. In further aspects, the sensor unit 100 can communicate data through the control unit 10 and to the computing device (with the control unit 10 simply serving as a pass-through device that allows for communication of data through the control unit, without the need for the control unit processing the device). In still further aspects, the sensor unit 100 can provide data to the computing device wirelessly (e.g., via an antenna).

The control unit 10 can be configured to pair with a communicatively coupled sensor unit 100. Optionally, the control unit 10 can be configured to recognize the sensor unit 100 so that the control unit 10 can tailor its interactions (e.g., power management) with the sensor unit 100. For example, the memory can comprise instructions that cause the processor to receive an identifying signal (e.g., a hardware ID or passive component key) from the sensor unit 100 so that the control unit can recognize the sensor unit. In some aspects, pairing can be performed automatically upon a physical connection between the control unit and the sensor unit. In further aspects, the control unit can be activated (e.g., when turned on or when a pairing button is pressed) to query the coupled sensor unit to receive an identifying signal.

It can be understood that battery management, wireless communication, etc. can be difficult, expensive, and time consuming to design, test, and validate. Thus, designing conventional systems having integral processing, power management, communications, and other such features for each sensor can become costly. It is thus contemplated that a single universal control unit that is configured to modularly adapt to a sensor unit can eliminate the need for designing and validating such features for each sensor.

It is contemplated that entities can design sensor units that are compatible with the control unit 10 without being privy to the specific (e.g., proprietary) design features of the control unit. For example, it should be understood that power management systems can be complicated and expensive to design. Thus, providing a control unit 10 that is modularly compatible with various sensor units 100 can relieve the cost of designing a power management system (as well as a sensor management system) for each sensor.

Accordingly, it is contemplated that the control unit 10 can further be configured to provide power to the sensor unit 100. In some aspects, the power source 30 can be a battery that can comprise an integral battery management system 32. In this way, the control unit 10 can be configured to operate with different alternative battery chemistries. When the control unit 10 is paired with a sensor unit 100, the control unit can determine the power requirements for the sensor unit, for example, based on instructions from the sensor unit 100 or instructions within the control unit's memory that are associated with the identity of the sensor unit 100.

Figure 2:
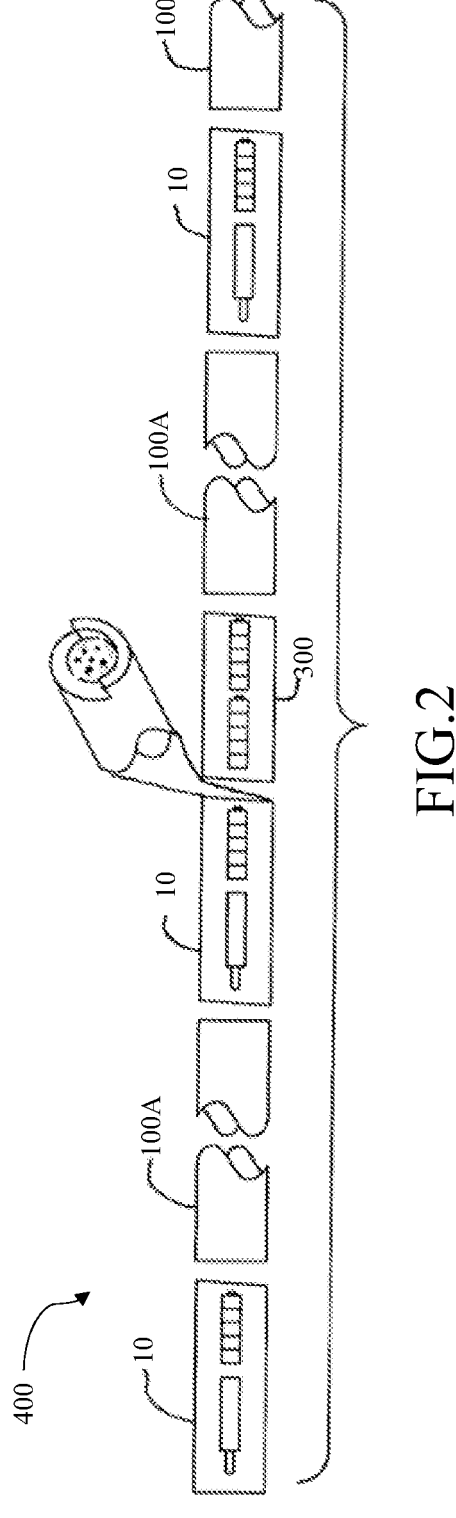
FIG. 2 is an exploded view of a sensing apparatus comprising a plurality of sensor assemblies, wherein one sensor assembly comprises an external power source.

In further aspects, as shown in FIG. 2, the control unit 10 can further couple to an external power supply 300, such as, for example, a supplemental battery pack (comprising one or more batteries). Accordingly, in some aspects, a sensor assembly 200 can comprise one or more external power supplies 300. In some aspects, for a given sensor assembly 200, the external power supply 300 can be positioned between the control unit 10 and the sensor unit 100. The control unit 10 can optionally couple to the external power supply 300 via the port 16. The external power supply 300 can further couple to the port 106. The external power supply 300 can comprise electrical leads that provide sensor data from the sensors/instrumentation 102 of the sensor unit 100 to the control unit 10. Alternatively, in optional aspects, the control unit 10 can comprise an external power input port on the second end 54 of the control unit (opposite the sensor unit 100), and the external power supply 300 can couple to the control unit on the second end 54. It is contemplated that the external power supply 300 can comprise a battery management system (BMS) as is known in the art. The BMS can identify the battery chemistry and the charge state of the battery, manage current and voltage outputs to keep the battery within safe or otherwise desirable limits (for example, based on the operating environment of the battery, such as in hot or cold environments or when extra power is required), and balance charge within cells of the battery.

The control unit 10 can comprise a programmable power supply that can control distribution of power from the power source 30 and from the external power supply 300. In some optional aspects, the programmable power supply can be configured to transition power usage between the power source 30 and the external power supply 300. Optionally, the memory 18 and coupled processor(s) 20 can operate as the programmable power supply. In further aspects, the programmable power supply can be independent of the memory 18 and coupled processor(s) 20.

The programmable power supply can comprise a DC/DC converter that can provide a required voltage output while using batteries that remain within regulatory codes (e.g., maximum 20V, 100 W-h batteries). That is, the DC/DC converter can provide the voltage required by at least one of the communications module or the sensor unit. The programmable power supply can further determine the source to draw from (e.g., to achieve optimum battery life). For example, the power source 30 and external power supply (or supplies) 300 can be connected in series. In this way, difficulties with providing battery power in parallel, such as, for example, complications due to inconsistent battery chemistry, can be avoided. The programmable power supply can be configured to, for example, draw power from a first power source (e.g., the external power supply 300) until the first power source is depleted, and, once the first power source is depleted, switch to a second power source (e.g., the power source 30 of the control unit 10). It is contemplated that the programmable power supply can receive information for the respective battery management systems of the power sources (e.g., those of the power source 30 and the external power supply 300), such as, for example, whether or not the battery is dead, the remaining amount of charge, and the voltage. Thus, it is contemplated that the programmable power supply can switch between power sources once the BMS of one source indicates that the corresponding battery is depleted or substantially depleted, or if the voltage drops below a threshold. It is contemplated that the adaptability of the control unit to work with various battery chemistries can enable batteries to be selected based on a given environment (e.g., high temperature) or sensor need (e.g., high power).

The control unit 10 can optionally be configured to go into a low power mode that reduces power consumption. For example, the control unit can determine, based on an absence of a wireless communication signal, that the control unit 10 is out of range of any communicating device and, in response, stop frequently searching for a signal (i.e., reduce the frequency at which the control unit 10 searches for a communication signal).

The memory of each control unit can be in communication with the processor, and the memory can comprise instructions, that, when executed, cause the processor to perform various steps. For example, the memory can comprise instructions that cause the processor to store, in the memory, received signals from the instrumentation 102 of the sensor unit, store a corresponding time from an internal clock, and link, in the memory, the stored signal and the corresponding time.

In some aspects, a plurality of sensor assemblies 200 can be linked together to provide a sensing apparatus 400. In some aspects, the sensor assemblies 200 can directly attach to each other. For example, in some aspects, the sensor assemblies 200 can define complementary mating structures. The complementary mating structures can be similar to, or the same as, those that couple the sensor unit 100 and the control unit 10. Thus, it is contemplated that the mating structures of the sensor assemblies 200 can comprise respective male and female threads, with the female threads optionally being defined by a threaded collar. In other aspects, it is contemplated that the mating structures of the sensor assemblies 200 can comprise a notched body with spring pins (on one sensor assembly) and a spring configured in a toroidal shape (on the mating sensor assembly). In further aspects, the sensor assemblies 200 can be coupled together indirectly, for example via a sensing apparatus housing 402. In some aspects, the sensing apparatus housing 402 can comprise a probe body, and a plurality of sensor assemblies 200 can be disposed within the sensing apparatus housing 402 to define a probe 404.

According to optional aspects, control units 10, sensor units 100, and external power supplies 300 can be linked together in a plurality of combinations. In some aspects, two sensor assemblies 200 can be coupled together end-to-end. For example, a sensing apparatus can comprise, from a first end to an opposed second end of the sensing apparatus, a first sensor assembly (comprising a first control unit and a first sensor unit) and a second sensor assembly (comprising a second control unit and a second sensor unit). In another exemplary configuration, a sensing apparatus can comprise, in order from a first end to an opposed second end of the sensing apparatus, a first sensor assembly (comprising a first control unit, an external power supply, and a first sensor unit) and a second sensor assembly (comprising a second control unit and a second sensor unit). In further aspects, it is contemplated that any number of sensor assemblies 200 can be coupled together end-to-end to form the sensing apparatus 400. In these aspects, it is contemplated that each sensor assembly can comprise any desired number of sensor units, provided communication with the associated control unit and adequate distribution of power are maintained.

It is contemplated that the components (e.g., a control unit 10 or a sensor unit 100) of the sensing apparatus 400 can have known lengths so that the positions of, and spacing between, the sensors can be known with respect to each other. Accordingly, the depth of one sensor of the sensing apparatus can be correlated to the depth of another sensor of the sensing apparatus. In this way, data collected simultaneously at different depths by two sensors spaced apart by the known distance can be correlated to each other for each depth.

In some optional aspects, it is contemplated that for high fidelity or high bit rate sensors, each sensor unit can be coupled to a respective control unit 10, whereas, for lower fidelity or lower bit rate sensors, one or two or more sensor units 100 can be coupled to a single control unit 10. In some aspects, a sensor assembly can comprise one control unit that is configured to couple to two separate sensor units. The control unit can be configured to provide power to both sensor units as well as receive, process, and store data from the two separate sensor units. One embodiment of a sensor assembly can comprise a control unit 10 coupled to a first sensor unit 100 and a second sensor unit 100 coupled to the end of the first sensor unit 100 opposite the control unit 10 (i.e., control unit-first sensor unit-second sensor unit). It is thus contemplated that the first sensor unit 100 can comprise circuitry that is configured to communicate power and data between the control unit and the second sensor unit. That is, the first control unit 100 can comprise pass-through communication for power and/or data.

In some aspects, the drill rig 600 can be at least partially controlled by the system 1000. For example, an activation of a control unit 10 can indicate that the control unit 10 is being deployed in the drill string, and, in response, limiting parameters can be provided to the drill rig. In exemplary aspects, a maximum tolerated rotation speed can prevent accidental drilling while a control unit is deployed, thereby preventing damage to the sensor assembly 200. Similarly, a maximum tolerated tripping rate can prevent excessive movement of the sensor assembly 200 that could inhibit accurate data collection. Accordingly, the system 1000 can provide maximum thresholds to the rotation and tripping rates to prevent the drill rig 600 from surpassing the respective tolerated rates.

Figure 3:
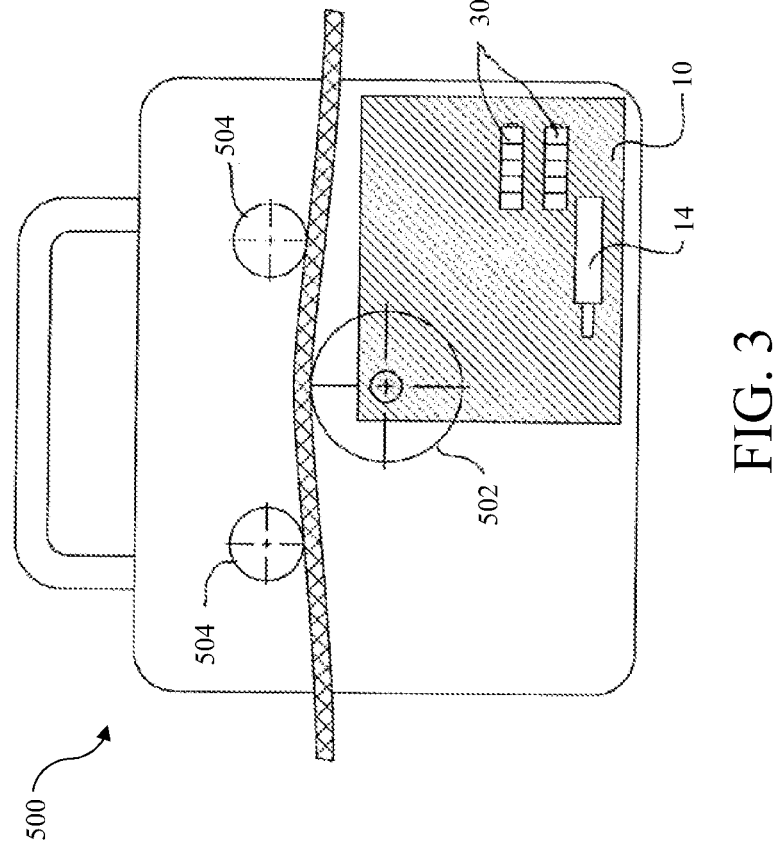
FIG. 3 is a sensor assembly that is not configured to be deployed down-the-hole, in accordance with embodiments disclosed herein.

Referring to FIG. 3, in further aspects, a control unit 10 can be configured for use with sensor units that are not deployed down-the-hole. For example, a wireline depth encoder 500 can comprise an encoder wheel 502 and a pair of tensioner wheels 504 that are configured to bias a wireline cable against the tensioner wheel 502 so that as the cable travels across the encoder wheel, the encoder wheel rotates with the cable. In this way, the position of the encoder wheel can correspond to the movement of the wireline cable, and, thus, the position of the instrumentation attached to the wireline cable. The control unit 10 can be configured to receive signals from the encoder wheel and store the positional data as well as associated time data. The control unit 10 can further provide any necessary power to the wireline depth encoder. It is further contemplated that the system 1000 can receive information via operator input, such as, for example, initial spacing between the wireline depth encoder 500 and the instrumentation on the wireline cable.

In further aspects, the control unit 10 can be adapted for use with other sensor units that are not deployed down-the-hole, such as, for example, mast position sensors or instrumentation that can monitor operation independent of rig control systems (e.g., chuck jaw status sensors, water flow sensors, safety interlocks, etc.). Such sensors can be configured to adapt old drill rigs lacking current sensors and technology to be modularly upgraded to include desired features. Optionally, the control unit 10 can be adapted for use with a wireless sub that includes various sensors as are known in the art. In exemplary aspects, it is contemplated that the sensors of the wireless sub can be configured to provide signals or outputs indicative of one or more of the following parameters: force measurement; weight-on-bit measurement; rotation speed measurement; torque measurement; mud pressure measurement; penetration rate; fluid flow rate; and combinations thereof.

In various aspects, the wireless sub can be coupled to at least one drill rod (of the drill string). The wireless sub can comprise processing circuitry that is configured to detect mechanical impulses of the drill string. The processing circuitry can be configured to wirelessly transmit signals indicative of the mechanical impulses to a remote computing device, such as a tablet, a computer, a smartphone, a touchscreen device, and the like. Drill rods can be added and removed distally (away from the rig) of the wireless sub so that the wireless sub can remain outside of a borehole during use.

When provided, the wireless sub can comprise various sensors for monitoring various aspects of drilling and drilling-associated activities, such as, for example, addition or removal of drill rods, core retrieval, and the like. In some aspects, mounting the wireless sub in-line enables detecting drill string mechanical impulses, such as, for example, axial and torsional vibrations resulting from dynamic load response. These axial and torsional vibrations can be associated with vibrational signatures that correspond to various operating conditions, such as a likelihood of drill string deformation. Accordingly, measured vibrations can provide information including, but not limited to, an indication of imminent permanent twisting deformation overload. An operator can receive an indication of such vibrational signatures and stop drilling or change the drilling parameters to prevent damage to the drill string. As should be understood, in further aspects, mechanical impulses detected by the wireless sub are not limited to vibrations.

According to some aspects, the wireless sub can couple to the drill string via an adapter sub or with one or more quick-attach adapter subs. A direct coupling of the wireless sub to the drill string (so that the wireless sub forms part of the drill string) enables the wireless sub to measure the vibrations of the drill string. Optionally, the wireless sub can attach to the drill string below the drill rig's top drive unit or to a "Kelly rod" in a hollow-spindle chuck-drive unit. As should be understood, a Kelly rod is a drill rod that is maintained at the top of the drill string while additional drill rods are added or subtracted below it. In some optional aspects, the wireless sub can be mated directly to the Kelly rod. In further aspects, an adapter sub can couple a drilling unit of a top-drive drill rig to the wireless sub. Vibrations of the drill rig can be dampened through the top-drive unit and drill string adapter sub (e.g., adapter subs for top-drive rigs) or through the chuck-drive and Kelly rod. Accordingly, the wireless sub can be at least partially isolated (or completely or substantially completely isolated) from the vibrations of the drill rig. This configuration can be contrasted with, for example, vibration sensors in a floating sub that receive vibrations from the drill rig, which mask the vibrations from the drill string and inhibit detection of drill string vibrational signatures. However, in some aspects, it is contemplated that the wireless sub can be provided in a floating sub configuration.

According to some aspects, the wireless sub can be maintained outside of the borehole throughout a drilling or mining operation. That is, during drill string makeup, drill rods can be added distally of the wireless sub. In maintaining the wireless sub outside of the borehole, the wireless sub is not constrained to a maximum diameter that is less than that of the borehole. Rather, the wireless sub can optionally have a diameter that is greater than the operative diameter of the drill bit or greater than the operative diameter of the borehole. Accordingly, the wireless sub can be sufficiently rigid and can be packaged with sufficient batteries for a long battery life. Further, in maintaining the wireless sub at the proximal end of the drill string (the end closest to the rig) and outside the borehole, the wireless sub can optionally maintain constant direct communication (for example, through a wireless communication protocol) with a remote computing device.

Computing Device

Figure 5:
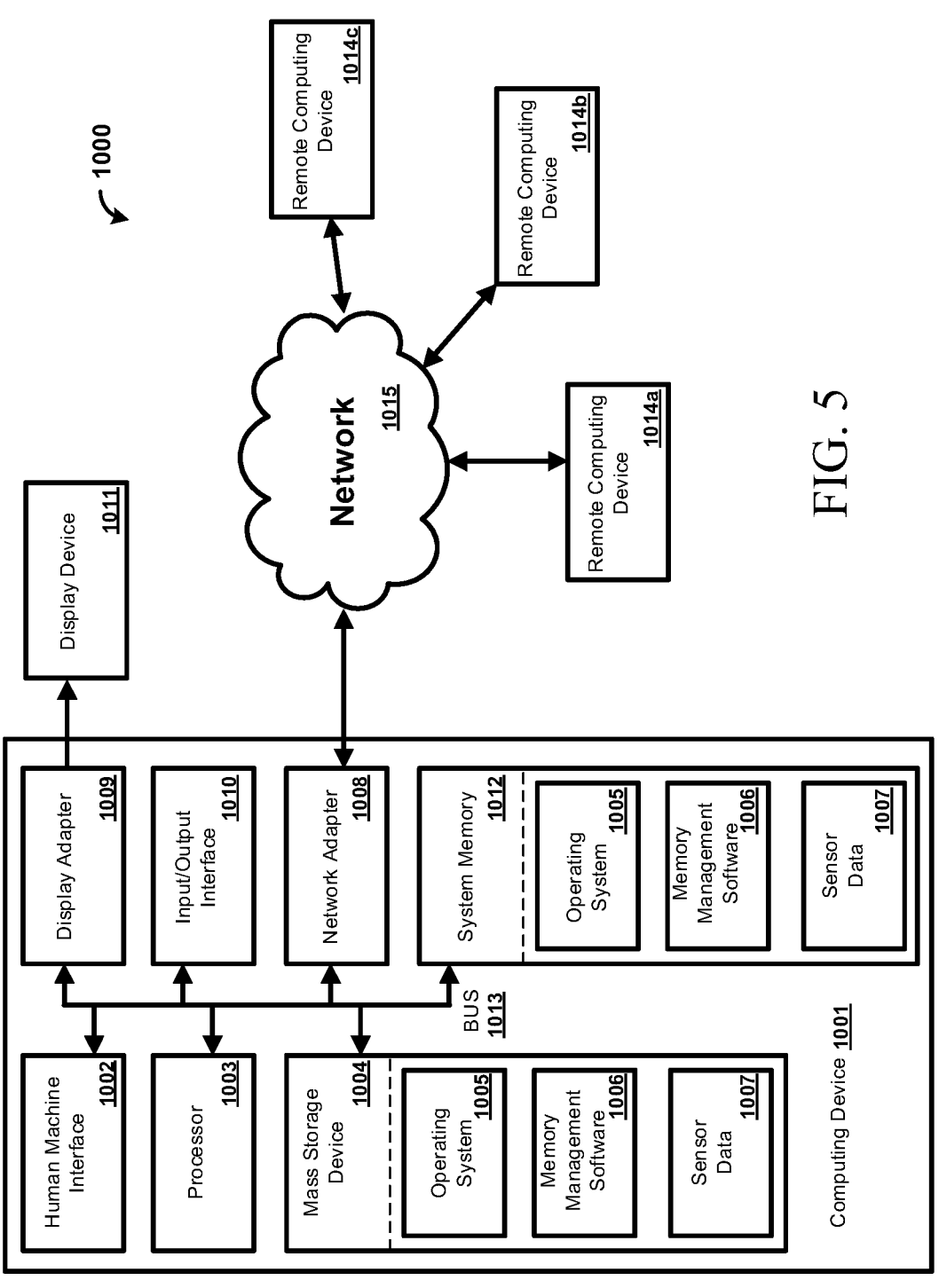
FIG. 5 is an operating environment comprising a computing device, in accordance with embodiments disclosed herein.

FIG. 5 shows a system 1000 including an exemplary configuration of a computing device 1001 for use with the control unit 10. It is contemplated that the computing device 1001 can be, for example, a tablet, laptop, or desktop computer that an operator can interface with. The computing device 1001 can have a display (optionally, a touchscreen display). The computing device can receive data collected by the sensors of the sensor units. For example, it is contemplated that a first control unit 10 can collect data from a first sensor unit and correlate said data with a corresponding time, and the control unit 10 can then provide, via wireless or physical (e.g., wired/cable) connection, the data correlated with the corresponding time to the computing device 100. A second control unit 10 can collect data from a second sensor unit, and the second control unit 10 can provide the data from the second sensor to the computing device 1001. In some optional aspects, the control unit 10 can process the data from the first sensor (e.g., turn a raw sensor signal into a meaningful metric, such as, for example, converting a voltage output by a pressure sensor to a corresponding sensed pressure, etc.) so that the data from the first and second sensors that the computing device 1001 receives can optionally be at least partially processed. The computing device 1001 can further display various data collected by the sensor units 200 as well as enable the operator to sort and manipulate the data. In some optional aspects, the computing device 1001 can further correlate data captured by the respective sensors with the time and/or the depth at which the data was captured. The computing device 1001 can optionally receive various inputs from an operator. In further aspects, the computing device 1001 can enable the operator to control aspects of the drill rig 600 (e.g., drill rotation speed or tripping speed).

It is further contemplated that the control unit 10 can be configured in accordance with the computing device 1001, as further disclosed herein.

The computing device 1001 may comprise one or more processors 1003, a system memory 1012, and a bus 1013 that couples various components of the computing device 1001 including the one or more processors 1003 to the system memory 1012. In the case of multiple processors 1003, the computing device 1001 may utilize parallel computing.

The bus 1013 may comprise one or more of several possible types of bus structures, such as a memory bus, memory controller, a peripheral bus, an accelerated graphics port, and a processor or local bus using any of a variety of bus architectures.

The computing device 1001 may operate on and/or comprise a variety of computer readable media (e.g., non-transitory). Computer readable media may be any available media that is accessible by the computing device 1001 and comprises, non-transitory, volatile and/or non-volatile media, removable and non-removable media. The system memory 1012 has computer readable media in the form of volatile memory, such as random access memory (RAM), and/or non-volatile memory, such as read only memory (ROM). The system memory 1012 may store data such as sensor data 1007 (i.e., data from signals received by the electrodes) and/or program modules such as operating system 1005 and memory management software 1006 that are accessible to and/or are operated on by the one or more processors 1003.

The computing device 1001 may also comprise other removable/non-removable, volatile/non-volatile computer storage media. The mass storage device 1004 may provide non-volatile storage of computer code, computer readable instructions, data structures, program modules, and other data for the computing device 1001. The mass storage device 1004 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the mass storage device 1004. An operating system 1005 and memory management software 1006 may be stored on the mass storage device 1004. One or more of the operating system 1005 and memory management software 1006 (or some combination thereof) may comprise program modules and the memory management software 1006. Sensor data 1007 may also be stored on the mass storage device 1004. Sensor data 1007 may be stored in any of one or more databases known in the art. The databases may be centralized or distributed across multiple locations within the network 1015.

A user may enter commands and information into the computing device 1001 using an input device (not shown). Such input devices comprise, but are not limited to, a keyboard, a touchscreen display, pointing device (e.g., a computer mouse, remote control), a microphone, a joystick, a scanner, tactile input devices such as gloves, and other body coverings, motion sensor, and the like. These and other input devices may be connected to the one or more processors 1003 using a human machine interface 1002 that is coupled to the bus 1013, but may be connected by other interface and bus structures, such as a parallel port, game port, an IEEE 1394 Port (also known as a Firewire port), a serial port, network adapter 1008, and/or a universal serial bus (USB).

A display device 1011 may also be connected to the bus 1013 using an interface, such as a display adapter 1009. It is contemplated that the computing device 1001 may have more than one display adapter 1009 and the computing device 1001 may have more than one display device 1011. A display device 1011 may be a monitor, an LCD (Liquid Crystal Display), light emitting diode (LED) display, television, smart lens, smart glass, and/or a projector. In addition to the display device 1011, other output peripheral devices may comprise components such as speakers (not shown) and a printer (not shown) which may be connected to the computing device 1001 using Input/Output Interface 1010. Any step and/or result of the methods may be output (or caused to be output) in any form to an output device. Such output may be any form of visual representation, including, but not limited to, textual, graphical, animation, audio, tactile, and the like. The display 1011 and computing device 1001 may be part of one device, or separate devices.

The computing device 1001 may operate in a networked environment using logical connections to one or more remote computing devices 1014*a,b,c*. A remote computing device 1014*a,b,c* may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network node, and so on. Logical connections between the computing device 1001 and a remote computing device 1014a,b,c may be made using a network 1015, such as a local area network (LAN), a general wide area network (WAN), and/or via Cloud-based network. Such network connections may be through a network adapter 1008. A network adapter 1008 may be implemented in both wired and wireless environments. Such networking environments are conventional and commonplace in dwellings, offices, enterprise-wide computer networks, intranets, and the Internet. It is contemplated that the remote computing devices 1014a,b,c can optionally have some or all of the components disclosed as being part of computing device 1001. It is contemplated that, for example the remote computing device 1014a can be a first control unit 10 (FIG. 1), the remote computing device 1014b can be a second control unit 10, and the remote computing device 1014c can be a computing device that controls the drill rig 600 (FIG. 4) and receives data (e.g., depth data based on the footclamp encoder data) for provision to the network 1015. In other aspects, it is contemplated that the computing device 1001 can be configured for wireless (e.g., WiFi and/or Cloud-based) communication with a remote computing device that receives the data collected by the computing device 1001 for further processing (e.g., quality assurance/quality control processing).

Use of the Disclosed Control Units and Systems

In use, it is contemplated that the disclosed control units and systems comprising such control units can provide independent power, memory, and/or wireless communications between individual sensors and a tool controller application, which can be executed by a computing device positioned outside the borehole (e.g., at surface). The modularity of the disclosed control units can allow each respective sensor unit (sensor type) to be independently initialized on the surface and then incrementally inserted into the borehole. The disclosed time stamping (with synchronized clocks) can allow for the use of multiple control units to synchronize data and provide a complete log of the borehole. The disclosed systems can also allow for use of variable power supplies and battery management systems, which can provide expandable energy storage to power unique device needs.

Figure 4:
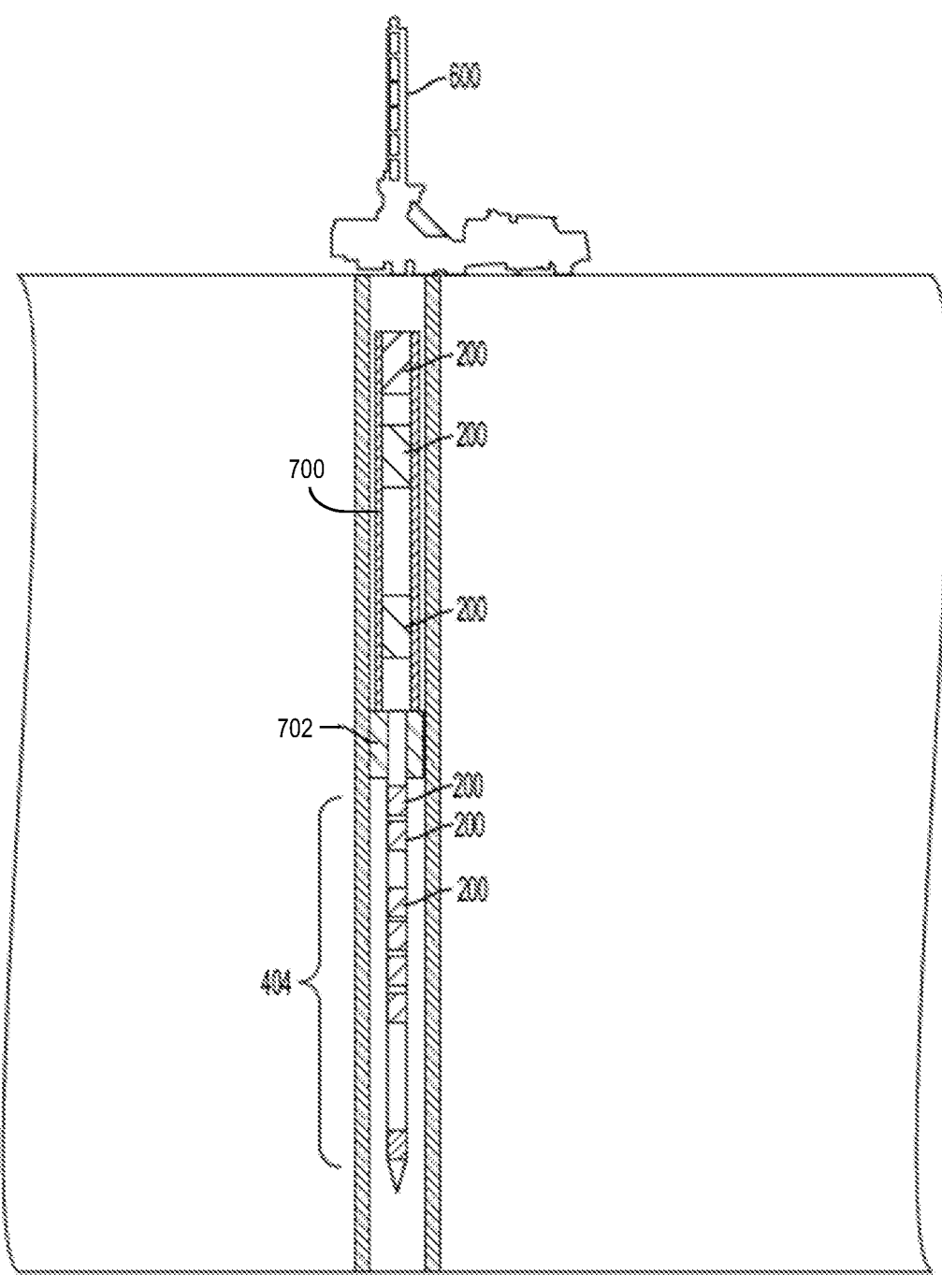
FIG. 4 is a system comprising a drill rig and a plurality of sensor assemblies.

In an exemplary sequence, the disclosed system can be used in a method comprising: determining depth of a borehole; synchronizing clocks of a plurality of control units and a computing device positioned at the surface (outside the borehole); removing a sufficient number of drill string components to accommodate a length of a sensing apparatus (e.g., a probe comprising the plurality of control units and a plurality of sensor units). Optionally, the borehole can be flooded with fluid. The sensing apparatus can then be lowered within the remaining drill string and docked (e.g., mechanically coupled) to the drill bit as shown in FIG. 4, with at least a portion of the sensing apparatus extending distal of the drill bit. A controlled tripping mode for the drill rig can be activated, and the sensing apparatus can provide continuous time-stamped data acquisition, with tripping being suspended during pulls of drill rods and/or at times when gyroscope data is recovered, resulting in extra data acquisition at those locations. The control units and sensor units can be sequentially retrieved as the most distally positioned drill rods are recovered. At surface, the control units can automatically sync with each other through the surface computing device, and the synchronized data can then undergo further processing by the surface computing device or a remote computing device. Optionally, drill rig data (such as data from a wireless sub, if provided) can be synchronized with the data recovered from the sensing apparatus.

EXEMPLARY ASPECTS

In view of the described device, systems, and methods and variations thereof, herein below are certain more particularly described aspects of the invention. These particularly recited aspects should not, however, be interpreted to have any limiting effect on any different claims containing different or more general teachings described herein, or that the "particular" aspects are somehow limited in some way other than the inherent meanings of the language literally used therein.

Aspect 1: A control unit comprising: a housing; circuitry disposed within the housing, the circuitry comprising: a communications module; a memory; and a processor in communication with the memory and the communications module; a power source disposed within the housing; and an input port that is configured to mate with a complementary output of a sensor unit that is external to the housing, wherein the input port is in communication with the circuitry, and wherein the input port is configured to interface with the sensor unit.

Aspect 2: The control unit of aspect 1, wherein the control unit has a longitudinal axis, a first end, and a second end that is spaced from the first end relative to the longitudinal axis, wherein the first end comprises the input port.

Aspect 3: The control unit of aspect 2 wherein the first end comprises an alignment feature that allows mating with the sensor unit only upon rotational alignment of a corresponding feature of the control unit.

Aspect 4: The control unit of aspect 3, wherein the alignment feature comprises a protrusion that is rotationally asymmetric about an alignment axis that is parallel to the longitudinal axis of the control unit.

Aspect 5: The control unit of any one of the preceding aspects, wherein the memory has instructions that, when executed by the at least one processor, cause the at least one processor to determine a type of sensor unit based on a signal received from the sensor unit.

Aspect 6: The control unit of any one of the preceding aspects, wherein the circuitry further comprises a DC/DC converter that is configured to change the voltage based on at least one of a requirement from the sensor unit or a requirement from the communications module.

Aspect 7: The control unit of any one of the preceding aspects, wherein the memory has instructions that, when executed by the at least one processor, cause the at least one processor to determine a depth of the control unit.

Aspect 8: The control unit of any one of the preceding aspects, wherein the power source is a battery, wherein the battery comprises a battery management system.

Aspect 9: The control unit of any one of the preceding aspects, wherein the circuitry is configured to detect a property of the power source.

Aspect 10: A sensing apparatus comprising: a control unit as in any one of the preceding aspects; and a sensor unit coupled to the first end of the control unit, wherein the sensor unit comprises an output port that is in communication with the input port of the control unit.

Aspect 11: The sensing apparatus of aspect 10, wherein the sensor unit comprises sensing instrumentation, wherein the sensing instrumentation is selected from the group consisting of: a gyroscope, an orientation sensor, a pressure sensor, a temperature sensor, a natural gamma detector, a magnetic susceptibility sensor, a resistivity sensor, an induced polarization sensor, and an acoustic televiewer.

Aspect 12: The sensing apparatus of aspect 10 or aspect 11, further comprising a supplemental battery, wherein the supplemental battery is in engagement with at least one of the control unit or the sensor unit.

Aspect 13: The sensing apparatus of aspect 12, each of the power source and the supplemental battery is selectively configured to be switched on and off.

Aspect 14: The sensing apparatus of aspect 13, wherein the circuitry is configured to selectively draw power from each of the the power source and the supplemental battery.

Aspect 15: The sensing apparatus any one of aspects 12-14, wherein the power source and the supplemental battery are electrically coupled in series.

Aspect 16: The sensing apparatus of any one of aspects 10-15, wherein the control unit is a first control unit, wherein the sensor unit is a first sensor unit, wherein the first control unit and the first sensor unit cooperatively define a first sensor assembly, wherein the sensing apparatus further comprises: a second control unit as in aspect 2; and a second sensor unit coupled to the first end of the second control unit, wherein the second sensor unit comprises an output port that is in communication with the input port of the second control unit, wherein the second control unit and the second sensor unit cooperatively define a second sensor assembly, wherein the first sensor assembly is mechanically coupled to the second sensor assembly.

Aspect 17: The sensing apparatus of aspect 16, wherein the first sensor assembly is not in electrical communication with the second sensor assembly.

Aspect 18: A system comprising: a sensing apparatus as in aspect 10; and a computing device in communication with the communications module of the control unit.

Aspect 19: A system comprising: a sensing apparatus as in aspect 16; and a computing device in communication with the communications module of the control unit, wherein the computing device comprises a memory and at least one processor in communication with the memory of the computing device, wherein the memory of the computing device has instructions thereon that, when executed, cause the processor to: receive data from the first sensor unit; receive data from the second sensor unit; and store the data from the first sensor unit and the second sensor unit so that the data from the first sensor unit is related to the data from the second sensor unit.

Aspect 20: The system of aspect 19, wherein the system is configured to determine a relative position of the first sensor assembly with respect to the second sensor assembly.

Those skilled in the art will recognize, or be able to ascertain using no more than routine experimentation, many equivalents to the specific embodiments of the method and compositions described herein. Such equivalents are intended to be encompassed by the following claims.

What is claimed is:

1. A sensing apparatus comprising:
a first sensor assembly; and
a second sensor assembly,
wherein each sensor assembly of the first and second sensor assemblies comprises:

a sensor unit; and
a control unit having:
    a housing;
    circuitry disposed within the housing, the circuitry comprising:
        a communications module;
        a memory; and
        a processor in communication with the memory and the communications module;
    a power source disposed within the housing; and
    an input port that is configured to mate with a complementary output of the sensor unit that is external to the housing,
    wherein the input port is in communication with the circuitry, and wherein the input port is configured to interface with the sensor unit, and
wherein the sensor unit is coupled to the first end of the control unit, and wherein the sensor unit comprises an output port that is in communication with the input port of the control unit,
wherein the first sensor assembly is mechanically coupled to the second sensor assembly,
wherein the first sensor assembly is not in electrical communication with the second sensor assembly.

2. The sensing apparatus of claim 1, wherein each of the sensor units comprises sensing instrumentation, wherein the sensing instrumentation is selected from the group consisting of: a gyroscope, an orientation sensor, a pressure sensor, a temperature sensor, a natural gamma detector, a magnetic susceptibility sensor, a resistivity sensor, an induced polarization sensor, and an acoustic televiewer.

3. The sensing apparatus of claim 1, further comprising a supplemental battery, wherein the supplemental battery is in engagement with at least one of the control unit or the sensor unit of each of the first and second sensor assemblies.

4. The sensing apparatus of claim 3, each of the power source and the supplemental battery is selectively configured to be switched on and off.

5. The sensing apparatus of claim 4, wherein the circuitry is configured to switch the power source and the supplemental battery on and off.

6. The sensing apparatus of claim 3, wherein the power source and the supplemental battery are electrically coupled in series.

7. The sensing apparatus of claim 1, wherein the input port comprises one of:
a male port comprising pins that are configured to engage a plurality of targets of a female socket of the sensor unit; or
a female port comprising a plurality of targets that are configured to engage respective pins of a male socket of the sensor unit.

8. The sensing apparatus of claim 1, wherein the one of the control unit or the sensor unit further comprises at least one gasket that forms a fluid seal between the sensor unit and the control unit, and wherein the collar surrounds the at least one gasket.

9. The sensing apparatus of claim 1, wherein the input port of the control unit is configured to interface with the output port of the sensor unit only in a predetermined rotational alignment, wherein the first end of the control unit comprises an alignment feature that allows mating with the sensor unit only upon rotational alignment of a corresponding feature of the sensor unit, wherein the alignment feature of the control unit is configured for sliding engagement with the corresponding feature of the sensor unit, wherein, upon rotational alignment between the alignment feature of the control unit and the corresponding feature of the sensor unit, the input port is in the predetermined rotational alignment with the output port of the sensor unit so that axial sliding of the alignment feature of the control unit along the corresponding feature of the sensor unit effects rotationally aligned engagement of the input port with the outlet port of the sensor unit.

10. The sensing apparatus of claim 9, wherein the alignment feature comprises at least one surface extending parallel to the longitudinal axis, wherein the at least one surface is configured to slidingly engage a corresponding at least one surface of the sensor unit extending parallel to the longitudinal axis to allow mating with the sensor unit only upon rotational alignment of the at least one surface of the assignment feature and the corresponding at least one surface of the sensor unit.

11. The sensing apparatus of claim 1, wherein the memory has instructions that, when executed by the at least one processor, cause the at least one processor to determine a type of sensor unit based on a signal received from the sensor unit.

12. The sensing apparatus of claim 1, wherein the circuitry further comprises a DC/DC converter that is configured to change the voltage based on at least one of a requirement from the sensor unit or a requirement from the communications module.

13. The sensing apparatus of claim 1, wherein the memory has instructions that, when executed by the at least one processor, cause the at least one processor to determine a depth of the control unit.

14. The sensing apparatus of claim 1, wherein the power source is a battery, wherein the battery comprises a battery management system.

15. The sensing apparatus of claim 1, wherein the circuitry is configured to detect a property of the power source via a battery management system, wherein the circuitry is configured to establish a setting based on the property of the power source, wherein the setting is a power usage or a usage of a DC/DC converter.

16. A system comprising:
a sensing apparatus as in claim 1; and
a computing device in communication with the communications module of the control unit.

17. A system comprising:
a sensing apparatus as in claim 1; and
a computing device in communication with the communications module of the control unit, wherein the computing device comprises a memory and at least one processor in communication with the memory of the computing device, wherein the memory of the computing device has instructions thereon that, when executed, cause the processor to:
receive data from the first control unit;
receive data from the second control unit; and
store the data from the first sensor unit and the second sensor unit so that the data from the first sensor unit is related to the data from the second sensor unit.

18. The system of claim 17, wherein the system is configured to determine a relative position of the first sensor assembly with respect to the second sensor assembly.

* * * * *